United States Patent Office 3,496,246
Patented Feb. 17, 1970

3,496,246
CATALYST AND PROCESS FOR SELECTIVELY
HYDROGENATING ETHYLENE
Nai Yuen Chen, Cherry Hill, N.J., assignor to Mobil Oil
Corporation, a corporation of New York
No Drawing. Continuation-in-part of application Ser. No.
550,589, May 17, 1966. This application Mar. 14, 1969,
Ser. No. 807,446
Int. Cl. C07c 5/04, 5/14
U.S. Cl. 260—677
18 Claims

ABSTRACT OF THE DISCLOSURE

Catalyst suitable for selectively hydrogenating ethylene in the presence of propylene can be prepared by ion exchanging, with a solution of metal salt where the metal is a hydrogenation metal, a hydrogen aluminosilicate zeolite which, when converted to the sodium form, is characterized by pores of a diameter capable of admitting ethylene and propylene to the interior, but which will exclude propane from the interior. After ion exchange, the zeolite is exchanged with sodium ion and converted to the sodium form, and then its exterior surface is rendered catalytically inactive.

CROSS-REFERENCE TO RELATED APPLICATION

This application is a continuation-in-part of my application Ser. No. 550,589, filed May 17, 1966, now abandoned.

This invention is concerned with selective catalysis. More particularly, this invention relates to the preparation of catalysts capable of selectively catalyzing certain reactions of ethylene in the presence of other olefins such as, e.g., propylene. The invention further relates to a method of selectively catalyzing such reactions of ethylene in the presence of other olefins using the foregoing catalysts and, in particular, to the selective hydrogenation of ethylene to ethane in the presence of propylene.

In the catalytic cracking of hydrocarbon crudes one of the commercially significant product streams recovered preponderates in ethylene and propylene. In many instances the propylene component is of particular interest, e.g., for subsequent polymerization to polypropylene. The presence of ethylene in the propylene-ethylene hydrocarbon stream is, however, disadvantageous in that it has been necessary to resort to relatively expensive and cumbersome procedures in order to separate the ethylene from the propylene, to thereby produce a pure propylene stream suitable for subsequent polymerization to polypropylene.

In accordance with one aspect of the present invention, there is provided a method for preparing a selective catalyst for use in the hydrogenating of ethylene to ethane in the presence of propylene. When such a catalyst is contacted under hydrogenating conditions with a feed stream containing ethylene and propylene, the ethylene is hydrogenated to ethane without the propylene interfering with this hydrogenation reaction. Inasmuch as propylene can be polymerized to polypropylene in the presence of ethane, i.e., the ethane does not significantly affect the homopolymerization reaction, the foregoing provides a propylene-ethane mixture which can be utilized, as is, for the production of polypropylene. Obviously, if instead there were utilized a stream containing ethylene and propylene, the ethylene would copolymerize with the propylene to produce an ethylene-propylene copolymer rather than the desired polypropylene homopolymer.

The catalysts employed in the present invention are prepared by (1) introducing to a material capable of forming alkali metal aluminosilicate zeolite crystals having substantially uniform pores of a diameter capable of admitting ethylene and propylene to the interior thereof but excluding propane from entry to the interior, prior to the formation of such alkali metal aluminosilicate zeolite crystals, a metal or metal cation wherein the metal or metal cation is platinum, nickel, cobalt, palladium, rhodium, or iridium, (2) forming alkali metal aluminosilicate zeolite crystals to thereby trap the metal or metal cations within the interior of the zeolite, and (3) rendering the surface of the zeolite catalytically inactive.

According to one embodiment of this invention the catalyst is prepared by ion exchanging a crystalline aluminosilicate zeolite, this zeolite having substantially uniform pores of a diameter capable of admitting ethylene and propylene to the interior thereof but excluding propane from entry to the interior, e.g., mordenite, with hydrogen ions to thereby obtain the hydrogen form of such zeolite. The hydrogen zeolite is characterized by substantially uniform pores of a diameter capable of admitting cations of the foregoing metals (Pt, Ni, Co, Pd, Rh, or Ir) to the interior thereof. The hydrogen zeolite is then ion exchanged with a metal salt wherein the metal cation may be any of the foregoing cations or mixtures thereof, to introduce cations of the metal into the inerior of the hydrogen zeolite.

The metal-containing hydrogen zeolite is then exchanged with sodium ions so as to convert it from the hydrogen form to the sodium form, which latter form is characterized by uniform pores of a diameter capable of admitting ethylene and propylene but excluding propane from the interior catalytic surface. Accordingly, metal previously introduced into the interior is "trapped" and cannot pass out through the pores of the zeolite (sodium form).

The sodium zeolite is characterized by active exterior and interior catalytic surfaces. The exterior catalytically active surfaces arise from the fact that the previous ion exchange with metal cations deposits metal on the exterior surfaces of the zeolite as well as within the interior of the zeolite. It is accordingly necessary to render such exterior surfaces catalytically inactive. This may be done by contacting the zeolite with a substance capable of poisoning the externally active ions but being incapable of reaching the active sites located within the interior cavities. Alternatively, an additional base exchange treatment may be effected utilizing a solution containing an ion of a size too large to permit it to enter the interior cavities, but effective in exchanging catalytically active to catalytically inactive ions in all external locations.

According to another embodiment of this invention, an ethylene-propylene feed stream is contacted, in the presence of hydrogen, with a catalyst prepared by admixing (1) a crystalline aluminosilicate zeolite-forming solution capable of crystallizing to form a crystalline aluminosilicate zeolite having substantially uniform pores of a diameter capable of admitting ethylene and propylene to the interior thereof but excluding propane from entry to the interior and (2) a water-soluble metal compound wherein the metal is Pt, Ni, Co, Pd, Rh, Ir, or mixtures thereof, thermally treating the whole to effect crystallization whereby the growth of crystals of the zeolite takes place in the presence of the metal compound to afford a crystalline product containing the metal compound therewithin, dehydrating the crystalline product to obtain, a crystalline aluminosilicate zeolite containing throughout the metal, ions of the metal, or mixtures thereof, the crystalline aluminosilicate zeolite being characterized by substantially uniform pores of a diameter capable of admitting ethylene and propylene to the interior thereof but excluding propane from entry to the interior, and rendering the surface of the zeolite catalytically inactive. This technique for trapping metal and/or metal cations within the crystalline zeolite is described in further detail in my copending application Ser. No. 235,135, filed Nov. 2, 1962, and in Frilette et al. copending application Ser. No. 319,639, filed Oct. 29, 1963, the contents of each being incorporated herein by reference.

As noted, the crystalline aluminosilicate zeolite is one characterized by uniform pores having a diameter capable of permitting entry to the zeolite interior of ethylene and propylene, but incapable of permitting propane to enter therewithin. Typical crystalline aluminosilicate zeolites which may be used include zeolite A, mordenite, Barrer's species S, chabazite, gmelinite and the like.

Chabazite, gmelinite, and mordenite are naturally occurring crystalline aluminosilicate zeolites. Synthetic mordenite may, of course, also be employed, e.g., made as described in German Patent 1,176,106 or as described in Dutch Patent 299,503. The syntheses of zeolite A and of Barrer's species S are well known. See, e.g., U.S. Patent 2,882,243 (zeolite A) and Barrer et al., "Hydrothermal Chemistry of the Silicates, Part VIII," pp. 195–208 J. Chem. Soc. (1959).

Crystalline alkali metal and alkaline earth metal aluminosilicates employed in preparation of the metal-containing composites described herein are essentially the dehydrated forms of crystalline natural or synthetic hydrous siliceous zeolites containing varying quantities of alkali or alkaline earth metal and aluminum. The alkali or alkaline earth metal atoms, silicon, aluminum and oxygen in these zeolites are arranged in the form of an aluminosilicate salt in a definite and consistent crystalline pattern.

Where such crystalline aluminosilicates are synthesized, the process for their preparation generally involves heating, in aqueous solution, an appropriate mixture of oxides, or of materials whose chemical composition can be completely represented as a mixture of oxides $Na_2O$, $Al_2O_3$, $SiO_2$ and $H_2O$ at a temperature of approximately 100° C. for periods of 15 minutes to 90 hours or more. The product, which crystallizes within this hot mixture is separated therefrom and water washed until the water in equilibrium with the zeolite has a pH in the range of 9 to 12 and thereafter is dehydrated by heating. Usually, an alkali metal silicate serves as the source of silica and an alkali metal aluminate as the source of alumina. An alkali metal hydroxide is suitably used as the source of the alkali metal ion, and, in addition, contributes to the regulation of the pH. All reagents are preferably soluble in water.

Considering the first embodiment of this invention, the initial zeolite, e.g., mordenite, which is characterized by uniform pores having a diameter capable of admitting ethylene and propylene but not propane to the interior, is subjected to ion exchange with a source of hydrogen ions to thereby convert the zeolite to the hydrogen form, such hydrogen form being characterized by a larger pore diameter, typically about 9 angstrom units.

The source of hydrogen ions may conveniently be any mineral acid, e.g., hydrochloric acid, sulfuric acid, nitric acid, phosphoric acid, etc., or an organic acid such as, e.g., acetic acid. Alternatively, a source of ammonium ions may be employed, e.g., an ammonium salt such as ammonium sulfate, to thereby introduce ammonium ions, followed by calcination to liberate ammonia and leave hydrogen ions.

Generally an aqueous solution of the acid or ammonium salt is employed. The exchange may be a continuous treatment or a series of batch exchanges. The temperature of the solution is usually from about room temperature to 100° C., although higher temperatures can be employed under positive pressure. The time of treatment may be from a few minutes up to several hours.

The resulting hydrogen zeolite, which is characterized by uniform pores having a diameter of about 9 angstroms is hence capable of being exchanged with an ion exchange solution containing a salt of one of the foregoing metals, whereby the metal cation thereof will enter the interior of the zeolite. As noted previously, the metal portion of the metal salt employed in the ion exchange solution may be platinum, nickel, cobalt, palladium, rhodium, or iridium, with particular preference being accorded to platinum. The salt is desirably one wherein the metal is part of the cationic portion thereof.

Suitable metal compounds include:

$[Pt(NH_3)_6]Cl_4$, $[Pt(NH_3)_5Cl]Cl_3$, $[Pt(NH_3)_4Cl_2]Cl_2$
$[Pt(NH_3)_3Cl_3]Cl$, $[Pt(NH_3)_2Cl_4]$, $[Pt(NH_3)_4]Cl_2$,
$[Pt(NH_3)_2Cl_2]$
$[Pt(NH_3)_4](OH)_2$, $[Pt(C_2H_5OH)_2Cl_4]$,
$[Pt(C_6H_5CN)_2Cl_4]$
$[Pt(NH_3)_2(CN)_2]$, $[Pt(NH_2-CH_2-CH_2-NH_2)_2]Cl_2$,
$[Pd(NH_3)_2(NO_2)_2]$
$[Pd(NH_3)_2(C_2O_4)]$, $[PtCl_2 \cdot CO]$, $[OsCl_2 \cdot 3CO]$,
$Ni(NH_3)_6Cl_2$
$Co(NH_3)_6Cl_2$, $Rh(NH_3)_4Cl_2$, $Rh(H_2O)_4Cl_2$, etc.

The salt is desirably used in aqueous solution. The exchange is carried out so as to impart to the resulting zeolite, on a dry basis, from about 0.001 to 5 weight percent of the metal, more desirably at least about 0.01 weight percent and preferably at least about 0.1 weight percent. Thus, the concentration of the solution and conditions of treatment are not critical, provided that they are such as to result in the desired metal content.

By way of illustration, a crystalline aluminosilicate zeolite containing platinum and having substantially uniform pores of a diameter capable of admitting ethylene and propylene to the interior thereof but excluding propane from entry to the interior may readily be prepared by immersing mordenite (e.g., sodium Zeolon) in dilute HCl (e.g., 0.12 normal), stirring for 15 minutes at room temperature, and filtering. This procedure is repeated twice. The resulting hydrogen mordenite is water washed to remove acid, and then ion exchanged with a dilute platinum salt aqueous solution, e.g., tetraamine platinous chloride, by immersing the hydrogen mordenite in the platinum salt solution and permitting the whole to stand overnight until substantial equilibrium is reached. The zeolite is then filtered and the ion exchange repeated, followed by filtering and drying. The resulting H mordenite contains of the order of 0.1 weight percent platinum on a dry basis. The ratio of platinum on the exterior of the zeolite to that in the interior is approximately 1 to 100.

It is to be noted that rather than using a metal salt solution for ion exchange to introduce the metal to the zeolite interior, an impregnation technique may be employed. For instance, the metal may be present as a component of an acid such as, e.g., chloroplatinic acid ($H_2PtCl_6$), $H_2PdCl_4$, or the metal (in this case platinum) may be added in the form of sodium chloroplatinate, ammonium chloroplatinate, etc. For instance, hydrogen mordenite may be immersed in a solution of chloroplatinic acid whereby the $H_2PtCl_6$ is gradually drawn within the zeolite so as to introduce the metal (in this case platinum) to the interior. Suitable other metal compounds that may be used to effect impregnation include cobaltocene (dicyclopentadienyl cobalt), nickelocene (dicyclopentadienyl nickel), nickel tetracarbonyl $[Ni(CO)_4]$, cobalt tetracarbonyl $[Co(CO)_4]$, and the like.

The amount of metal introduced into the zeolite in accordance with this embodiment of the invention, whether by ion exchange or impregnation, may vary depending upon the particular metal employed. For platinum, palladium, iridium and rhodium the amount should be at least 0.001 weight percent of the zeolite on a dry basis. Desirably the range should be from about 0.01 to 1 percent by weight, and preferably from about 0.1 to 0.3 weight percent. Where the metal is nickel or cobalt, the amount introduced is desirably from about 0.1 to 4 percent by weight, and preferably from about 0.5 to 2 percent. Of course, higher amounts than the upper limits referred to may be employed, but there is no need to go to such higher amounts inasmuch as such higher amounts do not appreciably increase the catalytic activity.

In order to "trap" the interior metal within the zeolite it is necessary to subject the metal-containing hydrogen zeolite to an appropriate ion exchange. By virtue of such ion exchange, the pore size of the zeolite is reduced such that the resulting zeolite (containing "trapped" metal therein) is such as to permit entry to the zeolite interior of ethylene and propylene but to exclude propane therefrom. A particularly preferred cation for such ion exchange is the sodium ion, whereby the zeolite is converted from the hydrogen form (e.g., hydrogen mordenite) to the sodium form (mordenite). Suitable water soluble salts include the chloride, acetate, nitrate, and sulfate. It is desirable that the pH during such exchange be relatively high, e.g., at least about 10.5. This is readily achieved by the use of sodium hydroxide along with the sodium salt solution in the ion exchange.

The sodium form of the metal-containing zeolite should be subjected to appropriate treatment in order to deactivate the external catalytic surface (rendered catalytically active by virtue of the deposition of the metal thereon as well as within the interior of the zeolite). As noted, this deactivation may be effected by contacting the zeolite with a substance capable of poisoning the active surface ions but incapable of reaching (and thus affecting) the active sites located within the cavities.

It is desirable that the complex of the poison formed upon contact with the external catalytic sites disposed on the outer surface of the porous solid be stable under the conditions at which reaction is carried out. Further, the poisoning compound utilized should be such that it should neither react with the charge materials nor possess catalytic activity contrary to the purpose for its use. The volatility and stability of the poison compound moreover, should be sufficiently low to prevent its elution from the catalyst under conditions employed for the catalyzed reaction.

Suitable organic phosphorous compounds useful as poisoning media for the external catalytic sites of the catalytic compositions employed herein, include organic, and particularly cyclic, phosphates, phosphites, phosphonates, phosphonites, and phosphines. Typical of such compounds are the dibenzylphosphates, dibenzylphosphites, dibutylphenylphosphonites, diphenyl methylphosphates, diphenyl phenylphosphonites, diphenyl phosphites, dicresyl phosphites, ethylene (bis) diphenyl phosphines, ethylene (bis) diphenyl phosphine oxides, naphthyl phosphates, triphenyl phosphines, triphenyl phosphine oxides, triphenyl phosphates, triphenyl phosphites, tri (dimethylphenyl) phosphates, and tri cresyl phosphates.

The amount of catalytic poison employed will depend on its relative effectiveness. Thus, strongly chemisorbed materials need be present at only extremely low levels, and may persist in effectiveness long after initial contact with the catalyst. Weakly chemisorbed poisons are generally needed at substantially greater levels, and it may be desirable to introduce such materials continuously into the charge stock to maintain effective action. Ordinarily, the amount of poison added is sufficient to inhibit the activity of the external catalytic sites, and usually is within the approximate range of 0.01 to 10 weight percent of the charge stock, or between about 1 and 10 weight percent based on the catalyst.

Poisoning of the catalyst may be accomplished by addition of the organic phosphorous-containing poison compound to the charge stream prior to contacting with the catalyst. Alternatively, it may be desirable to contact the catalyst with a suitable poisoning compound prior to bringing the same into contact with the charge stock. In some instances, it may be feasible to contact the catalyst simultaneously with the poisoning compound, and the charge stock. When the catalyst is pretreated with the poisoning compound, such is generally accomplished by contacting particles of the catalyst with the poisoning material or a suitable solution containing an amount of such material sufficient to poison the exterior catalytic sites of the catalyst. The particles are thereafter removed from contact with excess poisoning material or solution thereof, and subjected to a drying operation during which the solvent of the solution, if such was used, is evaporated.

Another means of deactivating the external catalytic surface involves base exchange utilizing a solution containing catalytically inactive ion having a size too large to permit it to enter within the interior of the zeolite, which ion is effective in exchanging with catalytically active surface ions. For instance, mordenite containing cobalt throughout the interior catalytic surface and on the external catalytic surface (e.g., obtained by exchanging hydrogen mordenite with a cobalt salt to introduce cobalt ions, followed by exchange with sodium ions to convert the hydrogen mordenite to the sodium form and hence trap interior cobalt) may be subjected to ion exchange with tetramethylammonium ions, e.g., tetramethylammonium chloride solution. The tetramethylammonium cation is too large to penetrate the interior of the mordenite but will exchange off cobalt present on the surface, thereby deactivating the external surface.

As noted, according to a second embodiment of this invention the catalyst is prepared by "growing" the zeolite crystals about the metal compound. Thus a crystalline aluminosilicate zeolite-forming solution capable of crystallizing to form a crystalline aluminosilicate zeolite having substantially uniform pores of a diameter capable of admitting ethylene and propylene to the interior thereof but excluding propane from entry to the interior is admixed with a water-soluble metal compound wherein the metal is Pt, Ni, Co, Pd, Rh, Ir, or mixtures thereof. This mixture is subjected to thermal treatment so as to effect crystallization whereby the growth of crystals of the zeolite takes place in the presence of the metal compound to afford a crystalline product containing the metal compound therewithin. The crystalline product is then dehydrated to obtain a crystalline aluminosilicate zeolite containing throughout the metal, ions of the metal, or mixtures thereof, the crystalline aluminosilicate zeolite being characterized by substantially uniform pores of a diameter capable of admitting ethylene and propylene to the interior thereof but excluding propane from entry to the interior. The surface of the zeolite is then rendered catalytically inactive.

As previously noted, reference may be had to my copending application Ser. No. 235,135, filed Nov. 2, 1962, and to Frilette et al. copending application Ser. No. 319,639, filed Oct. 29, 1963, for descriptions as to the growing of crystalline zeolite in the presence of metals and/or metal cations.

The metal compound that is present during the growth of the aluminosilicate zeolite crystals may be any of those previously discussed with respect to the first embodiment of this invention.

It is contemplated that water will ordinarily be the solvent for the metal compound used. The concentration of the metal compound in the solution employed may vary widely depending upon the amount of metal and/or metal ions desired in the final composition and on the conditions under which crystallization is effected. An amount of metal compound introduced into the zeolite forming mixture, however, is generally such that the ultimate crystalline zeolite contains therein an amount of metal and/or metal ions, expressed in terms of metal, from about 0.001 percent to about 5 percent by weight, and more usually between about 0.01 percent and about 2 percent by weight.

After the contact period, the resulting crystalline zeolite containing metal and/or metal ions therein is removed from the forming solution and washed with water.

The resulting material is then dried, generally in air, to remove substantially all of the water therefrom.

The dried material may be desirably subjected to an activating treatment to render the final composition catalytically active. Such treatment involves heating the dried material at a temperature in the approximate range of 250° F. to 1100° F. to effect at least partial conversion of the metal content to a catalytically active state.

The resultant crystalline aluminosilicate zeolite is characterized by uniform pores of a diameter capable of admitting ethylene and propylene but excluding propane. This crystalline zeolite contains, both in the interior and on the surface thereof, the metal and/or metal cations of whatever metal was present during the growth of the crystals. Accordingly it is necessary to render the surface metal catalytically inactive. This may be done by any of the methods described previously, i.e., poisoning the exterior catalytic surface, or ion-exchanging such active surface cations to replace them with catalytically inactive cations.

Another method of deactivating the surface of the zeolite is by treatment with a suitable complexing agent to thereby chelate off the catalytically active surface cations. Suitable complexing agents include di(tetraethylammonium) dihydrogen ethylenediamine tetraacetic acid; ethylenediamine tetraacetic acid (EDTA); diammonium dihydrogen EDTA; ammonium acid manganese EDTA; fluorides, such as sodium or ammonium fluoride; carboxylic and polycarboxylic acids and acid salts, such as citric acid and ammonium acid citrate; mixtures of such complexing agents; etc. The foregoing complexing agents will form a soluble chelate compound with catalytically active surface cations.

Treatment of the zeolite with the complex is desirably carried out by immersing the zeolite in an organic solution of the complex. Suitable solvents for the complex include aromatics such as benzene, toluene, and the like.

The catalysts produced by the method of this invention are particularly suitable for effecting selective reactions with ethylene in the presence of other olefins such as, e.g., propylene. For example, if such a catalyst is contacted with hydrogen and a stream made up of ethylene and propylene under appropriate hydrogenating conditions, the ethylene and hydrogen will enter into the interior of the catalyst whereupon the ethylene will be hydrogenated to ethane. While the propylene may also enter the catalyst interior, it either leaves the catalyst as propylene or, if it is hydrogenated to propane, the propane is trapped within the catalyst and cannot escape therefrom, being of such molecular size that it cannot exit through the pores of the catalyst.

A particularly unexpected discovery is the fact that the foregoing selective hydrogenation of ethylene to ethane can be carried out virtually indefinitely without any need to regenerate the catalyst to remove trapped propane. Thus, ordinarily it would be expected that during the course of the hydrogenation reaction propane would gradually accumulate within the catalyst interior until at some point the catalytic (hydrogenation) activity of the catalyst would be virtually nil. This does not in fact occur. While not wishing to be bound by any theory of operation, it may be that during the hydrogenation, equilibrium conditions are established as between ethylene, propylene, ethane and propane. If so, then when such equilibrium conditions are reached, and even though the catalyst interior is not "saturated" with propane, any further propylene entering the catalyst interior will exit as such and will not be hydrogenated to propane.

The following examples will further illustrate this invention. All parts are by weight unless otherwise stated.

EXAMPLE 1

In this example the starting material was synthetic mordenite manufactured by the Norton Co. This mordenite was in the hydrogen form and was characterized by uniform pores having an average pore diameter of about 9 angstrom units.

Five grams of hydrogen mordenite were placed in 50 ml. of water containing 0.01 gram of platinum in the form of $[Pt(NH_3)_4]Cl_2$. The mixture was stirred and permitted to stand overnight. It was then filtered, washed with an excess of water, and the resulting filter cake was placed in 100 cc. of one normal sodium acetate solution. The mixture was filtered and reexchanged two to three times to insure complete exchange with sodium ions, followed by a final filtration.

To test for hydrogenation, the rates of hydrogenation of ethylene, propylene, trans-butene-2 and isobutylene were compared. Thus, a 0.3 ml. sample of the foregoing sodium ion-exchanged catalyst product was placed in a microreactor. The catalyst was pretreated with air at 850° F. for one hour, followed by helium flushing for ten minutes. The hydrogenation test was carried out at temperatures between 150° F. and 500° F. using 100 ml. per minute of hydrogen and 4 ml. per minute of an approximately 1:1 mixture (by volume) of two olefins. The test results showed that this catalyst, which had not been subjected to a poisoning of the exterior active surface, was completely non-selective in that it resulted in 100% conversion of all reactants charged. The foregoing catalyst was then poisoned with triphenylphosphine. This was done utilizing 0.15 ml. of triphenylphosphine on a sample of 0:3 gram of catalyst in the microreactor at 400 to 500° F. in hydrogen. The thus poisoned catalyst was tested for hydrogenation activity. The results are shown in Table 1.

TABLE 1

| Temp., °F. | Conversion ($\epsilon$), percent | | | | Selectivity [1] | | |
|---|---|---|---|---|---|---|---|
| | $C_2^-$ | $C_3^-$ | $C_4^-$ | $iC_4^-$ | $C_2/C_3$ | $C_3/C_4$ | $C_4/iC_4$ |
| 150–350–500 | | | 0 | 0 | | | |
| 150–350–500 | | <0.1 | 0 | | | | |
| 500 | 28.1 | <0.1 | | | >330 | | |
| 350 | 17.9 | <0.1 | | | >197 | | |
| 150 | 1.0 | <0.1 | | | >10 | | |

$$^1 \text{Selectivity} = \frac{\ln\left(\frac{1}{1-\epsilon}\right)C_2}{\ln\left(\frac{1}{1-\epsilon}\right)C_3}.$$

The foregoing shows that the poisoned catalyst was highly selective for ethylene hydrogenation over the entire temperature range of 150–500° F. Analytical results showed that the catalyst contained 0.08% platinum and 0.01% phosphorous.

EXAMPLE 2

This example shows that it is essential that the hydrogen mordenite containing metal in its interior be changed to the sodium form in order to obtain the benefits of the present invention.

Three grams of hydrogen mordenite were placed in 50 ml. water containing 0.007 gram of platinum in the form of $[Pt(NH_3)_4]Cl_2$. The mixture was stirred and permitted to stand overnight. It was then filtered, the resulting filter cake was washed with 200 ml. $H_2O$ over the filter and then suspended in 50 ml. of water. A 0.3 ml. sample was tested for hydrogenation by the manner described in Example 1. The catalyst was found to be very active (100% conversion) but not selective. The catalyst was then poisoned using triphenylphosphine as described in Example 1. The completely poisoned catalyst had very little activity toward all olefins including ethylene. This clearly indicates that hydrogen mordenite is not a shape selective catalyst.

EXAMPLE 3

This example illustrates the necessity of conducting the metal ion exchange on the hydrogen form of the zeolite.

Five grams of sodium mordenite were suspended in 50 ml. of one normal sodium acetate solution. The pH of the solution was adjusted to 10.5 by adding dilute sodium hydoxide (0.5 gm./l.) so as to facilitate complete sodium ion exchange. The mixture was permitted to stand overnight and was then filtered. The filter cake was washed with 200 ml. dilute NaOH solution (0.5 gram per liter) and placed in 50 grams of dilute NaOH solution containing 0.01 gram platinum in the form of $[Pt(NH_3)_4]Cl_2$. The mixture was stirred and permitted to stand overnight and was then filtered. The filter cake was washed with 200 ml. of dilute sodium hydroxide and then placed in 50 ml. of 1 normal alkaline sodium acetate solution (pH=10.5). A 0.3 ml. sample was tested for hydrogenation by the procedure described in Example 1. The catalyst was found to be very active (100% conversion), but was not selective. The catalyst was then poisoned with triphenylphosphine as described in Example 1. The poisoned catalyst had no activity toward any olefins including ethylene. These results clearly indicate that the Pt metal could not enter the intracrystalline cavities of the sodium mordenite.

EXAMPLE 4

This example illustrates that embodiment of the invention wherein there is admixed a metal compound and a crystalline aluminosilicate-forming solution and thereafter the crystals are "grown" about the metal compound to "trap" the metal therewithin.

A platinum-containing crystalline aluminosilicate having a high degree of crystallinity was prepared by admixing the following solutions:

(A) 92 grams of sodium aluminate (containing 41.3 weight percent $Al_2O_3$ and 35.4 weight percent $Na_2O$) and 0.8 gram of tetrammine platinous chloride $$(Pt(NH_3)_4Cl_2)$$

dissolved in 400 ml. of distilled water at room temperature, filtered and 1 ml. of concentrated ammonium hydroxide added to the filtrate.

(B) 120 grams of sodium metasilicate $$(Na_2SiO_3 \cdot 9H_2O)$$

(containing 21 weight percent $SiO_2$ and 22.9 weight percent $Na_2O$) dissolved in 400 ml. of distilled water at room temperature.

Solutions A and B were poured simultaneously with stirring into a 1500 ml. beaker at room temperature to form a white voluminous and gelatinous solid. The solid gel is next placed on a water bath and heated with stirring for two hours at about 95° C. with the addition of hot distilled water to maintain constant solution volume. At the end of two hours, the reaction mixture was heated to a temperature of about 100 to 102° C. and stirring was continued for another 3 hours.

30 grams of the above crystalline aluminosilicate catalyst containing platinum were decanted from its mother liquor and then slurried with a 100 ml. wash solution containing 150 grams of sodium chloride in 1000 ml. of water. The crystals were then stirred for 15 minutes in the wash solution, allowed to stand for 30 minutes and then filtered. At this point, the wash procedure was repeated an additional six times. A sample of the catalyst was then air dried at 105° C. and calcined in air at 450° C. at an air flow rate of 10 ml. per minute for one hour and then cooled to 315° C.

The catalyst was then poisoned with triphenylphosphine as described in Example 1 (0.15 ml. triphenyl phosphine at 400–500° F. in hydrogen). The treated catalyst was tested for hydrogenation activity. Results were as follows.

(Temp., 150° F.)

Conversion, percent:
$C_2^=$ _____ 20.2
$C_3^=$ _____ <0.1
$C_4^=$ _____ <0.1
$iC_4^=$ _____ <0.1

Selectivity:
$C_2/C_3$ _____ >22.6
$C_3/C_4$ _____ 0
$C_4/iC_4$ _____ 0

Variations can, of course, be made without departing from the spirit of this invention.

Having thus described the invention, what is desired to be secured and claimed by Letters Patent is:

1. A method of preparing a catalyst suitable for selectively hydrogenating ethylene in the presence of propylene, this method comprising (1) contacting a hydrogen aluminosilicate zeolite which, when converted to the sodium form is characterized by substantially uniform pores of a diameter capable of admitting ethylene and propylene to the interior thereof but excluding propane from entry to the interior, with a solution of a metal salt wherein the metal is platinum, nickel, cobalt, palladium, rhodium, iridium, or mixtures thereof to thereby intrduce cations of said metal into the interior of said hydrogen zeolite, (2) ion exchanging the resulting metal-containing zeolite with sodium ions to convert said zeolite from the hydrogen form to the sodium form having uniform pores of a diameter capable of admitting to the interior of the zeolite ethylene and propylene but excluding propane, and (3) rendering the surface of said zeolite catalytically inactive.

2. The method of claim 1 wherein the treatment with metal salt solution is carried out under such conditions that the metal content in the resultant zeolite is from about 0.001 to 5 percent by weight on a dry basis.

3. The method of claim 2 wherein the metal content is from about 0.01 to 2 percent by weight on a dry basis.

4. The method of claim 2 wherein the metal salt is a platinum salt.

5. The method of claim 1 wherein the surface of the zeolite is rendered catalytically inactive by treatment with an agent capable of poisoning the surface catalytic activity, said agent being of sufficient size that it is incapable of entering into the interior of the zeolite.

6. The method of claim 1 wherein the surface of said zeolite is rendered catalytically inactive by ion exchange with catalytically inactive ions, said catalytic inactive ions being of sufficient size that they cannot enter into the interior of the zeolite.

7. A method of selectively hydrogenating ethylene in the presence of another olefin comprising contacting the ethylene and said olefin in the presence of hydrogen with a crystalline aluminosilicate zeolite catalyst having uniform pores of a diameter capable of admitting ethylene and propylene to the interior thereof but excluding propane therefrom, said catalyst having dispersed within its pores metal, metal cations, or mixtures thereof wherein the metal or metal cations are platinum, nickel, cobalt, palladium, rhodium, iridium, or mixtures thereof, the content of said metal being from about 0.001 to 5% by weight of said catalyst on a dry basis, the exterior surface of said catalyst being catalytically inactive.

8. The method of claim 7 wherein the olefin is propylene, whereby ethylene enters into the interior surface of the catalyst and is hydrogenated to ethane while propylene which enters the catalyst either leaves the catalyst as propylene or is hydrogenated to propane which is trapped within the interior of the catalyst.

9. A method for selectively hydrogenating ethylene to ethane in the presence of another olefin comprising charging an ethylene-propylene mixture to a catalyst in the presence of hydogen, the catalyst having been prepared by (1) introducing, to a material capable of forming alkali metal aluminosilicate zeolite crystals having substantially uniform pores of a diameter capable of admitting ethylene and propylene to the interior thereof but excluding propane from entry to the interior, prior to the formation of said alkali metal aluminosilicate zeolite crystals, a metal salt wherein the metal is platinum, nickel, cobalt, palladium, rhodium, iridium, or mixtures thereof, (2) forming said alkali metal aluminosilicate zeolite crystals to thereby trap said metal or metal cations within the interior of said zeolite, and (3) rendering the surface of said zeolite catalytically inactive.

10. The method of claim 9 wherein the treatment with metal salt solution is carried out under such conditions that the metal content in the resultant zeolite is from about 0.001 to 5 percent by weight on a dry basis.

11. The method of claim 10 wherein the metal content is from about 0.01 to 2 percent by weight on a dry basis.

12. The method of claim 10 wherein the metal salt is a platinum salt.

13. The method of claim 9 wherein the surface of the zeolite is rendered catalytically inactive by treatment with an agent capable of poisoning the surface catalytic activity, said agent being of sufficient size that it is incapable of entering into the interior of the zeolite.

14. The method of claim 9 wherein the surface of said zeolite is rendered catalytically inactive by ion exchange with catalytically inactive ions, said catalytic inactive ions being of sufficient size that they cannot enter into the interior of the zeolite.

15. The method of claim 9 wherein the surface of said zeolite is rendered catalytically inactive by treatment with a complexing agent to form a soluble chelate compound with the catalytically active surface cations.

16. The method of claim 9 wherein the olefin is propylene, whereby ethylene enters into the interior surface of the catalyst and is hydrogenated to ethane while propylene which enters the catalyst either leaves the catalyst as propylene or is hydrogenated to propane which is trapped within the interior of the catalyst.

17. The method of claim 1 wherein the hydrogen aluminosilicate zeolite is hydrogen mordenite.

18. A method of selectively hydrogenating ethylene in the presence of propylene comprising contacting ethylene and propylene in the presence of hydrogen with a crystalline sodium mordenite catalyst having uniform pores of a diameter capable of admitting ethylene and propylene to the interior thereof but excluding propane therefrom, said catalyst having dispersed within its pores metal, metal cations, or mixtures thereof wherein the metal or metal cations are platinum, nickel, cobalt, palladium, rhodium, iridium, or mixtures thereof, the content of said metal being from about 0.001 to 5% by weight of said catalyst on a dry basis, the exterior surface of said catalyst being catalytically inactive.

References Cited

UNITED STATES PATENTS

| 3,128,317 | 4/1964 | Arkell et al. | |
| 3,136,713 | 6/1964 | Miale et al. | 208—113 |
| 3,314,895 | 4/1967 | Munns | 252—455 |
| 3,344,058 | 9/1967 | Miale | 252—455 |
| 3,367,884 | 2/1968 | Reid | 252—455 |

HERBERT LEVINE, Primary Examiner

U.S. Cl. X.R.

252—455